United States Patent [19]
Kelly et al.

[11] Patent Number: 5,379,440
[45] Date of Patent: Jan. 3, 1995

[54] PARALLEL PROCESSOR WITH ARRAY OF CLUSTERED PROCESSING ELEMENTS HAVING INPUTS SEPERATE FROM OUTPUTS AND OUTPUTS LIMITED TO A MAXIMUM OF TWO PER DIMENSION

[75] Inventors: Thomas Kelly; Lewis M. Mackenzie; Robert J. Sutherland, all of Glasgow, United Kingdom

[73] Assignee: Motorola Inc., Schaumburg, Ill.

[21] Appl. No.: 808,838

[22] Filed: Dec. 17, 1991

[30] Foreign Application Priority Data

Dec. 20, 1990 [GB] United Kingdom ............... 9027663

[51] Int. Cl.⁶ .................. G06F 13/00; G06F 15/16
[52] U.S. Cl. ................... 395/800; 364/228.3; 364/284; 364/284.3; 364/242.94; 364/229.5; 364/231.9; 364/232; 364/260.1; 364/DIG. 1; 364/931.4; 364/935.3
[58] Field of Search ............... 395/800, 200, 325

[56] References Cited

U.S. PATENT DOCUMENTS

| | | | |
|---|---|---|---|
| 4,247,892 | 1/1981 | Lawrence | 364/200 |
| 4,517,659 | 5/1985 | Chamberlain | 395/800 |
| 4,598,400 | 7/1986 | Hillis | 370/60 |
| 4,663,706 | 5/1987 | Allen et al. | 395/200 |
| 4,797,882 | 1/1989 | Maxemchuk | 370/94 |
| 4,805,091 | 2/1989 | Thiel et al. | 395/800 |
| 4,811,214 | 3/1989 | Nosenchuck et al. | 395/800 |
| 4,933,933 | 6/1990 | Dally et al. | 370/60 |
| 4,942,517 | 7/1990 | Cok | 395/800 |
| 5,065,308 | 11/1991 | Evans | 395/800 |
| 5,093,920 | 3/1992 | Agrawal et al. | 395/800 |
| 5,101,480 | 3/1992 | Shin et al. | 395/325 |
| 5,134,690 | 7/1992 | Samatham | 395/200 |
| 5,170,463 | 12/1992 | Fujimoto et al. | 395/11 |
| 5,175,865 | 12/1992 | Hillis | 395/800 |

OTHER PUBLICATIONS

"A Massively Parallel Processing System Based on a Hyper-Crossbar Network" C. Chin and W. Lin. 1988 IEEE.
"Distributed Routing using Topology Database in Large Computer Network" Kyoo Yeong Lee, 1988 IEEE.
Arthur H. Veen, "Dataflow Machine Architecture", ACM Computing Surveys, vol. 18, No. 4, dec. 1986, pp. 365–396.
David B. Gustavson et al., "Wire-OR Logic on Transmission Lines", IEEE MICRO, Jun. 1983, pp. 51–55.
Wim J. H. J. Bronnenberg et al., "DOOM: A Decentralized Object-Oriented Machine", IEEE Micro. Oct. 1987, pp. 52–69.
Ian Watson et al., "Flagship: A Parallel Architecture for Declarative Programming", IEEE 1988, pp. 123–131.

Primary Examiner—Alyssa H. Bowler
Assistant Examiner—Meng-Ai T. An
Attorney, Agent, or Firm—Gary W. Hoshizaki

[57] ABSTRACT

A processor is provided (FIG. 1) comprising a plurality of processing elements (10) arranged into D dimensions and divided into clusters (11), wherein all elements in a cluster have a bus (13) for communicating therebetween. Each element is a member of one cluster in each dimension. Each element in a cluster is connected to the bus in that cluster by output means (FIG. 3), for sending messages to a plurality of other elements in the cluster, and separate input means corresponding to each other element in the cluster for receiving messages from each other element on the corresponding separate input means.

17 Claims, 5 Drawing Sheets

NE — NETWORK ELEMENT
HE — HOST ELEMENT

*FIG.3*

NE — NETWORK ELEMENT
HE — HOST ELEMENT

FIG.6 and latency is inherently highly variable. Further, although the hypercube scales well in terms of bandwidth, doubling the number of processors increases the diameter by one, causing significant worst-case delays in larger assemblies.

It is a general aim in the field to achieve an architecture with high inter-connectability between nodes, so that a message has to pass through a minimum number of nodes to reach its destination. The ultimate limitation of interconnections is the wiring density that can physically be supported, or the limitations of other communication means between nodes (e.g. optical bus, freestanding optical transfusers or other means).

PARALLEL PROCESSOR WITH ARRAY OF CLUSTERED PROCESSING ELEMENTS HAVING INPUTS SEPERATE FROM OUTPUTS AND OUTPUTS LIMITED TO A MAXIMUM OF TWO PER DIMENSION

BACKGROUND OF THE INVENTION

This invention relates to an parallel processor having a parallel architecture using a large number of central processing units (CPU's) to achieve high power processing.

SUMMARY OF THE PRIOR ART

The use of multiple CPUs to increase processing performance, possibly by as much as several orders of magnitude, has been extensively discussed in recent years. The proposal is now widespread in both academic and commercial circles, and is beginning to be applied on a small scale at both a system level and to VLSI microprocessors. However, there are still at least two significant obstacles which stand in the way of its widespread acceptance and large-scale implementation. Firstly, it is extremely difficult to design and build the versatile and powerful communications subnet required by a highly parallel general-purpose computer; secondly, it is by no means clear how such a computer, once built, should be programmed. Much important research has already been carried out into new programming paradigms such as those based on the functional, object-oriented and dataflow models—see Bronnenberg WJHJ, Nijman L, Odjik, EAM, van Twist RAH "Doom; a decentralised object-oriented machine" IEEE Micro Vol 7 No 5 (October 1987) pp 547–553: Watson, I, et al "Flagship: a parallel architecture for declarative programming" in Processings of 15th Annual Symposium on Computer Architecture IEEE Comp Soc Press (1988) pp 124–130; Veen AH "Dataflow machine architecture" ACM Computing Surveys, Vol 18 No 4(December 1986) pp 365–396.

The purpose of subnet is to allow host elements (processing nodes and where appropriate memory) to form communication connections. Ideally these connections should have:

a) high bandwidth, allowing large amounts of data to be transferred between host elements whenever required;

b) low latency, ensuring that any process which has sent a message and requires a reply, never has to wait for an excessive period. The subnet can be a major contributor to poor latency, especially if there are many levels of switching to negotiate.

Further, the subnet should be able to maintain connections with uniform acceptable values of bandwidth and latency regardless of the relative physical location of the correspondents (metric symmetry) or the activity elsewhere in the network (connection independence). Finally, if an interconnection topolgy is to be usable in medium and large multicomputers, it should also be scalable, preserving favourable architectural properties (latency, bandwidth, symmetry and independence) over a wide range of possible network sizes.

A proposed architecture for a parallel processor is described in the paper "Communication Structures for Large Networks of Microcomputers" by Larry D Wittie published by IEEE, 1981.

A binary hypercube has low metric symmetry because some processors take much longer to reach from a given point than others, and latency is inherantly highly variable. Further, although the hypercube scales well in terms of bandwidth, doubling the number of processors increases the diameter by one, causing significant worst-case delays in larger assemblies.

SUMMARY OF THE INVENTION

According to the present invention, there is provided a processor comprising a plurality of processing elements arranged into D dimensions and divided into subsets, wherein all elements in a subset have a bus for communicating therebetween, and wherein each element is a member of one subset in each dimension, characterised in that each element in a subset is connected to the bus in that subset by output means, for sending messages to a plurality of other elements in the subset, and separate input means corresponding to each other element in the subset for receiving messages from each other element on the corresponding separate input means.

Whereas an element cannot send messages simultaneously to a large number of other elements, it is found that this does not seriously degrade the performance from the theorical optimum arrangement of total interconnection between every element in the subset and every other element in the subset on input and output lines. Therefore the performance is almost equivalent to the theoretical optimum performance, but the interconnection density is substantially reduced.

In a preferred embodiment, the elements in a subset are arranged in a line and an element positioned between the ends of the line has one output means for sending messages to other elements on one side thereof and separate output means for sending messages to elements on the other side along the line. This means that an element positioned between the ends of the line can simultaneously send messages to the left and fight along the line, and yet the critical wiring density is not increased, because the density is most critical at the points of cross over between busses in one line and busses in a perpendicular line. (An element can, in any case, simultaneously send messages to other elements within its subset and other elements within another subset of which it is a member.)

In the simplest arrangement, the processor comprises a two-dimensional array of elements and each row forms a subset and each column forms a subset. The element at the intersection of the row and column performs the task of communicating between the two subsets.

The expression "cluster" will hereinafter be used to refer to the subsets.

The invention provides the advantage of an architecture which is fundamentally scalable and modular, capable of supporting an unlimited number of processing elements (PE's) linked by means of a highly connected, symmetric, low-latency network, with a cost-performance characteristic comparable to that of a binary hypercube.

A degree of metric asymmetry is accepted by clustering PEs together in strongly connected groups and then joining these groups with additional high-bandwidth links, with the option of repeating the process iteratively.

Figure 1:
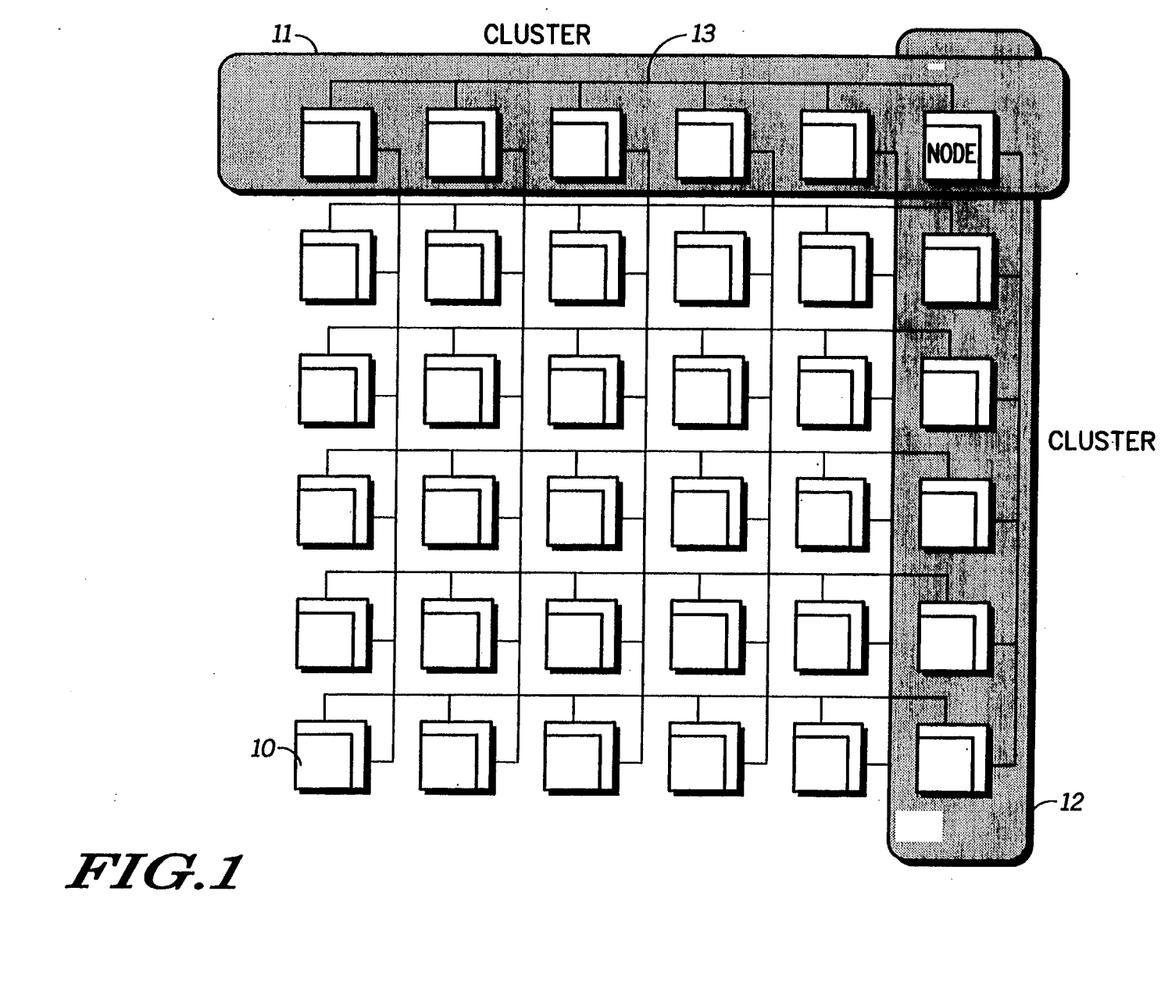
FIG. 1 shows a two-dimensional parallel processor in accordance with the invention.

Each cluster may contain any number of nodes to a maximum of w, the net width, which is a fixed characteristic of any implementation (although variable within the architecture). Every node possesses a uniquely owned undirection bus which connects it to any other element of its choice within the same cluster, implying, in turn, that it can select from w−1 identical incoming links (FIG. 1). Each line is electrically driven by only one output device to avoid the limiting phenomenon associated with sharing, the so-called wire-Or glitch (Gustavason D B, Theus J "Wire-Or logic on transmission lines" IEEE Micro Vol 3 No. 3 (June 1983) pp 51–55), which restricts the speed with which changes of ownership, or even signal direction can be effected. Transfer of data is allowed to an individual recipient, or via global or group cluster broadcasts.

The architecture depends critically on the manner of intercluster connection. A full system is a D-dimensional lattice formed by taking the Dth cartesian product of the cluster graph topology. This has the effect of imposing the cluster organization in every dimension, a recursively generated structure known as a generalised hypercube. FIG. 1 illustrates a two dimensional example, with each node belonging to two independent orthogonal clusters, forming a 2-D hyperplane. The approach can be extended to higher dimensions: an N-dimensional hypercube, where each node is equally a member of N clusters, is formed from w N−1 dimensional hyperplanes connected via w(N−1) cluster links. It is this arrangement of overlapping orthogonal clusters which provides the requisite high bandwidth interconnections for global message passing. Unlike a simple binary hypercube system it is preferred that D will adopt only low values (typically 2 or 3) even in truly massive implementations. For example with w=32, an achievable figure, a three dimensional structure would contain 32K PEs.

Because of the low latency of its connections, the hardware is capable of implementing shared memory as well as message passing. A processor wishing to access a shared location sends a short request message to the node possessing the location, and receives a reply (including data if the request is a read) once the request is processed. To minimise latency, remote memory management hardware may read and write global memory without processor involvement. In many cases, the penalty for uncontested accesses to such memory will be much greater than twice that for local RAM.

Referring to FIG. 1, there is shown a processor comprising an array of 6×6 processing elements 10, each of these elements forming a node in the array. Each row of elements forms a cluster 11 and each column forms a cluster 12. The array may extend into 3, or even more dimensions. In the case of 3 dimension, the array can be built up into 6 layers, each identical to that shown in FIG. 2, with each column forming a cluster. The same principles of symmetry are applied to extend the system into further dimension. For example a fourth dimension can be created by replacing each element with a cluster of 6 elements.

The 6 elements in a cluster are connected by a bus 13, which will be described in greater detail with reference to FIG. 3.

Figure 2:
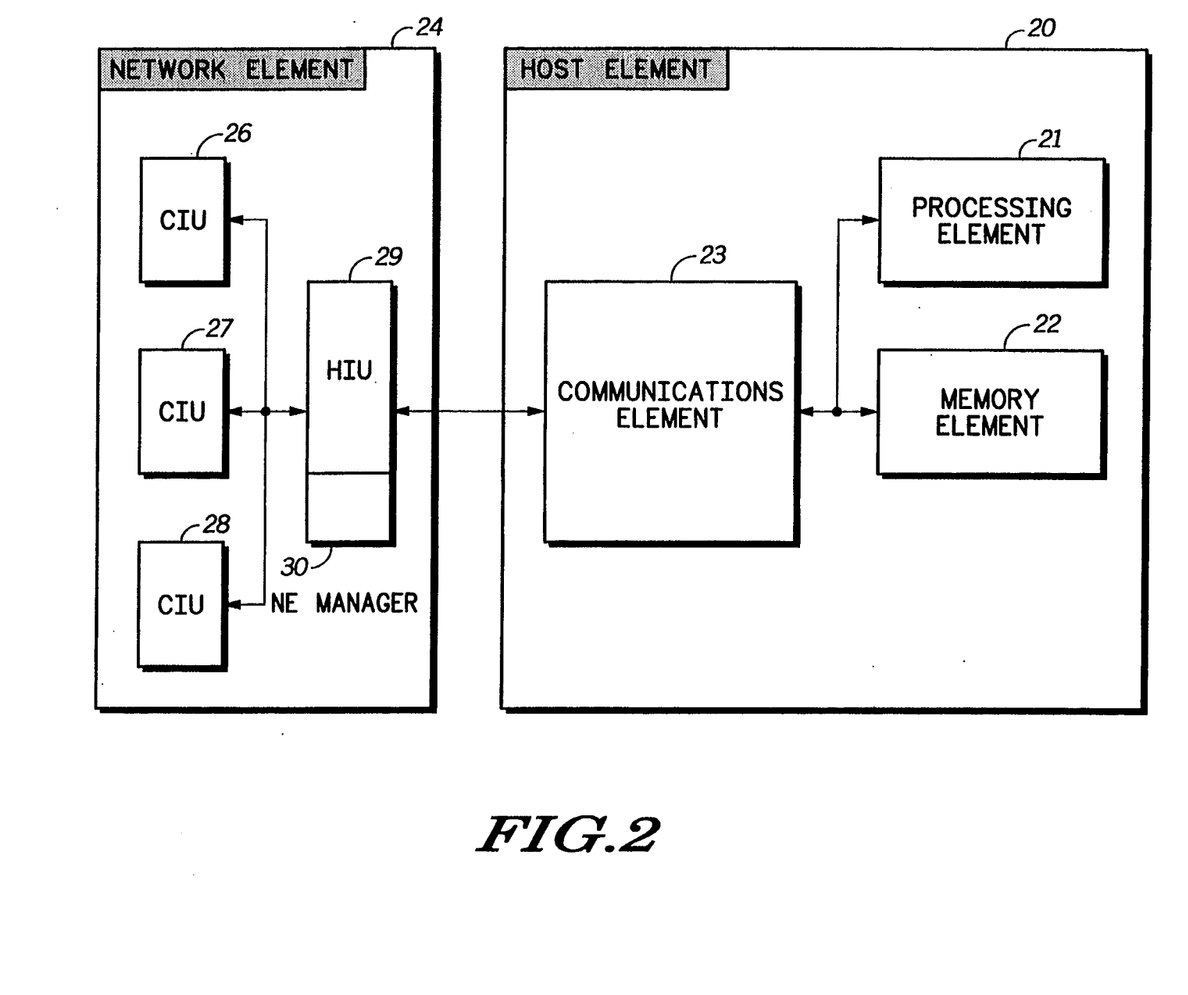
FIG. 2 shows the construction of a single node of the processor of FIG. 1.

Referring to FIG. 2, the structure of an element 10 is shown. The element comprises a host element 20, which may comprise one or more microprocessors 21, such as the Motorola M8800 microprocessor. The host element also contains memory 22 and communication circuitry 23. Associated with the host element is a network element 24, which comprises one cluster interface unit (CIU) 25 for dimension to which the node interfaces. In FIG. 2, three such CIUs are shown—26, 27 and 28. A single host interface unit (HIU) 29 is provided which is responsible for information exchanged with the host element 20. The network element 24 contains a network element manager 30.

Figure 3:
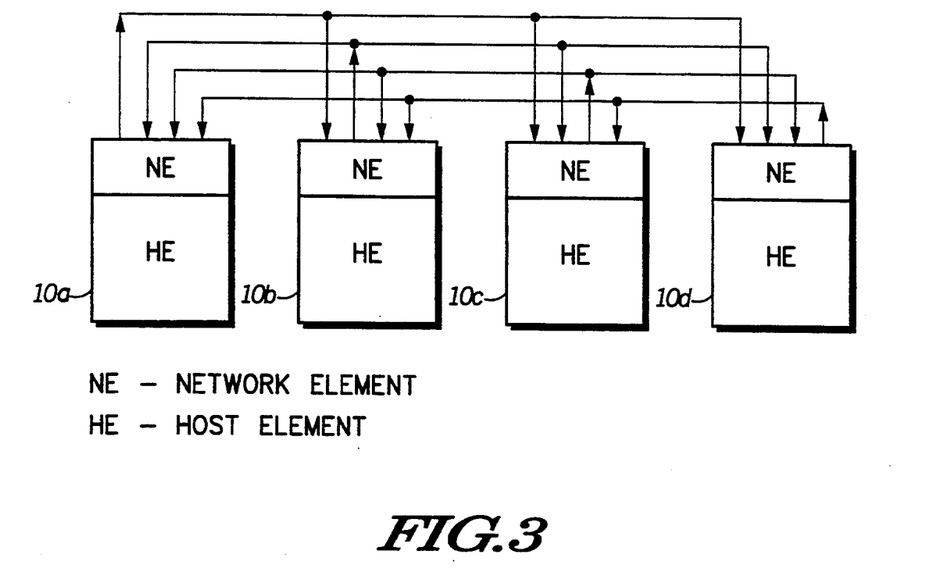
FIG. 3 shows the internal structure of a cluster of FIG. 1.

Referring to FIG. 3, a cluster of four elements 10 is shown. These are designated 10a, 10b, 10c and 10d. They are connected to a bus 13, which comprises four busses, each having 16 lines. One bus is connected for output from each network element. The output from one network element connects to an input of each other network in the cluster. Thus, each network element has one output and three inputs. Each host element will have a further output and further inputs for each other bus connected to it, corresponding to each other dimension of the array. Thus, a 3-dimensional array of width w=4 will have three outputs and twelve inputs for each network element. Each line of the bus 13 is electrically driven by only one output device. This avoids wire-or-glitches. The arrangement has the slight disadvantage that a host element can send only one message at time to any other element in its cluster. This, however, is not a major disadvantage, since the host element is in any case a serial device (or a limited number of serial devices) and can in any case simultaneously send a message to other elements in its orthogonal clusters.

Figure 4:
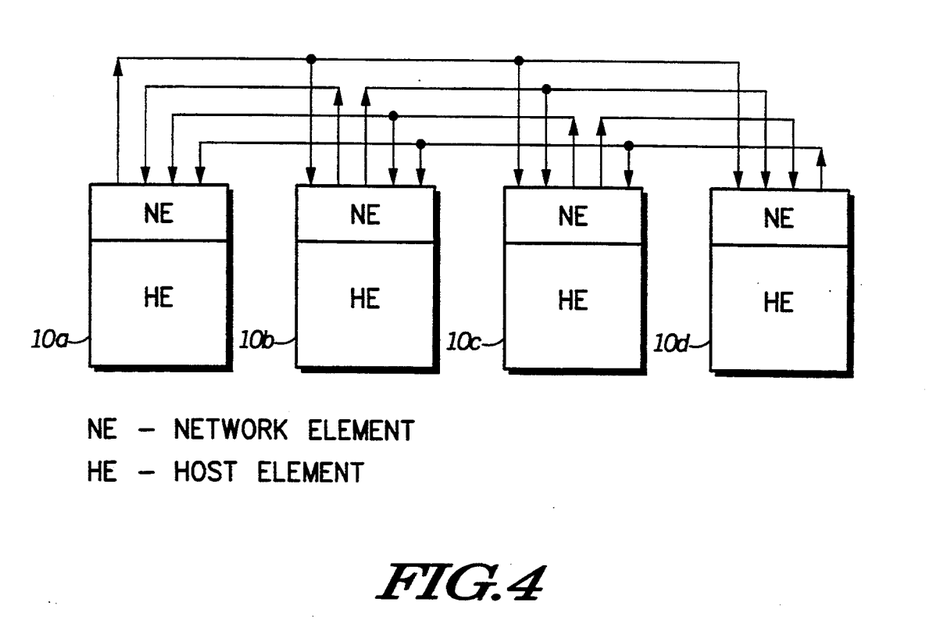
FIG. 4 shows an alternative arrangement for the cluster of FIG. 3.

One of the limiting factors in the density and interconnectability of an array as described is the wiring density. The wiring density limitation may take a number of forms, depending on whether the bus 13 is hardwired, microwave, optical, radio link etc. The area of greatest density of wiring is at the crossover points between orthogonal busses. FIG. 4 shows an arrangement which increases the interconnectability of elements within a cluster, without increasing the wiring density at the crossover points. In this arrangement, the element 10b and 10c between the ends of the bus, have two outputs each, one extending to the left and the other extending to the fight. Each of these elements can simultaneously send messages to the left and right along the bus. The only increase in wiring density is at the output of the network element. This is not a critical area.

The general operation of the apparatus is as follows. When any one network element 10 which is to send data or a command to any other network element, it constructs a packet in the communication element 23 addressing the destination element. This packet is sent via the host interface unit 29 through the appropriate cluster interface unit 26, 27 or 28 for the destination element. The destination element may, of course, not be in the same cluster as the source element and may have to be sent to a node at the intersection of the source cluster and the destination cluster, or there may be further intermediate steps. For an array of D dimensions, the maximum number of steps will be D. The network element manager 30 determines the route by which the packet will be sent to its destination. For example, in restricted routing, a message that has to go south west is first sent west and then sent south so as to avoid collision with messages arriving from the south west, which are first sent east and then sent north. Other routing protocols may be devised. On arrival at the bus 13 of the destination cluster, the message is recognised by the destination element by virtue of its address and is received in the cluster interface unit of that destination element.

On receipt of a packet, the packet is buffered in buffering memory in the network element 24. A network element 24 may receive several packets simultaneously for processing in its host element, or for sending on to an orthogonal cluster. Arbitration circuitry is provided in the cluster interface units 26, 27 and 28, for buffering a number of simultaneously arriving packets and processing them in a timely efficient manner. Where the packet is destined for the element itself, it is passed via the HIU 29 to the communication element 23 of the host element 20 and is processed by the processing element 21, or simply stored in memory element 22.

To provide an example, the operation $(a+b) \times (c+d)$ can be performed by parallel processing as follows. Provided that all the parameters are available, the operation $a+b$ can be carried out in one element in the array while the operation $c+d$ is carried out in a second element. The first and second elements transmit packets containing the results of these calculations to a third element, which performs a multiplication operation on the results.

Network Issues

A preferred method of routing messages is a variant of worm hole routing as described in Daily W J, Seitz C L "Multicomputers: message-passing concurrent computers" IEEE Computer Vol 21 No. 8 (August 1988) pp 9-23. Each worm consists of only one head and will be referred to as a packet.

Processing elements, as discussed above, are connected into clusters of width w in each available dimension. In any cluster to which it belongs, a node has undirectional line which allows it to transmit a packet to any one of the other $w-1$ nodes comprising that cluster, or indeed to broadcast the packet simultaneously to any subgroup of these. Packets arriving at a node are of two basic types:
a) intracluster: travelling on the last (possibly the only) link of their journey, being delivered locally;
b) intercluster: passing to an orthogonal cluster after being received by the current node.

Arriving packets are buffered and then await selection by the CIU which chooses from its $w-1$ sources using a high-speed round robin algorithm Selected packets are treated differently depending on their type. Intracluster packets are passed to the HE, via the HIU, and are eventually written directly into predesignated areas of local buffer memory. Intercluster packets go directly to the CIU of the next orthogonal cluster on their route. Packets follow the minimal distance path to the destination, except in the presence of a fault. Because even large system ($>10^4$ nodes) have diameters typically no more than 3, routing is essentially trivial over the entire spectrum of feasible sizes. Deadlocks are easily avoided either by restricting routing or by incorporating structured buffer management. The low diameter will minimise the performance disadvantages of these strategies.

In addition to packets carrying data, the network layer recognises special packets called network control packets (NC Packets) which pass control information between NEs. This may comprise housekeeping information for such tasks as buffer management, an automatic function performed by the CIUs. In addition, however, control packets are employed by the NE Manager which is responsible for monitoring network activity, load balancing (where appropriate) and strategic congestion control.

Link Issues

Communication between NEs within a cluster is over a high bandwidth link. There are great advantages in decoupling link and network functions: in particular, it is possible to isolate features which are highly dependent on the link implementation technology. In practice the cluster link can be realized in several ways: as a short broad active backplane with interfaces surface mounted; demultiplexed point-point links; multiple optical star configuration; or even as set of ULSI devices. Transfer rates of up to 1 GBytes/sec might be possible using an active backplane or demultiplexed star distributor. Different link protocols may be appropriate for these different technologies: for example the protocol which would be used on a parallel bus implementation, would differ from that required by a serial optical cable.

A 16-bit undirectional bus implementation has been adopted together with an associated parallel bus link protocol. Unlike a typical LAN or WAN protocol, the link layer does not attempt to provide error or flow control (both effected by network layer) but it is responsible for delimitation of packets on physical links, preservation of transparency, and multidrop addressing.

Global Memory

The packet structure is designed to support shared-access global memory. Because of the possible size of a system it is clear that 32-bit addressing will not provide uniform access to whole global address space. The constituent processes use typically a 32-bit virtual address converted by local MMUs to 32-bit physical address. Global memory is organised in logical addressing units or superpages, each of which may be interleaved over any hyperplane of dimension $H<D$. Thus in a two-dimensional system, all global memory can be fully interleaved over all HEs ($H=2$), can be interleaved only over local clusters ($H=1$) or can be split into coexisting areas of both, used by different suites of collaborating processes. This allows a great deal of flexibility across a wide range of shared memory applications. Short accesses to global memory are transmitted with a unique CLP priority, and are treated like expedited packets to minimise latency.

Host Elements

Figure 5:
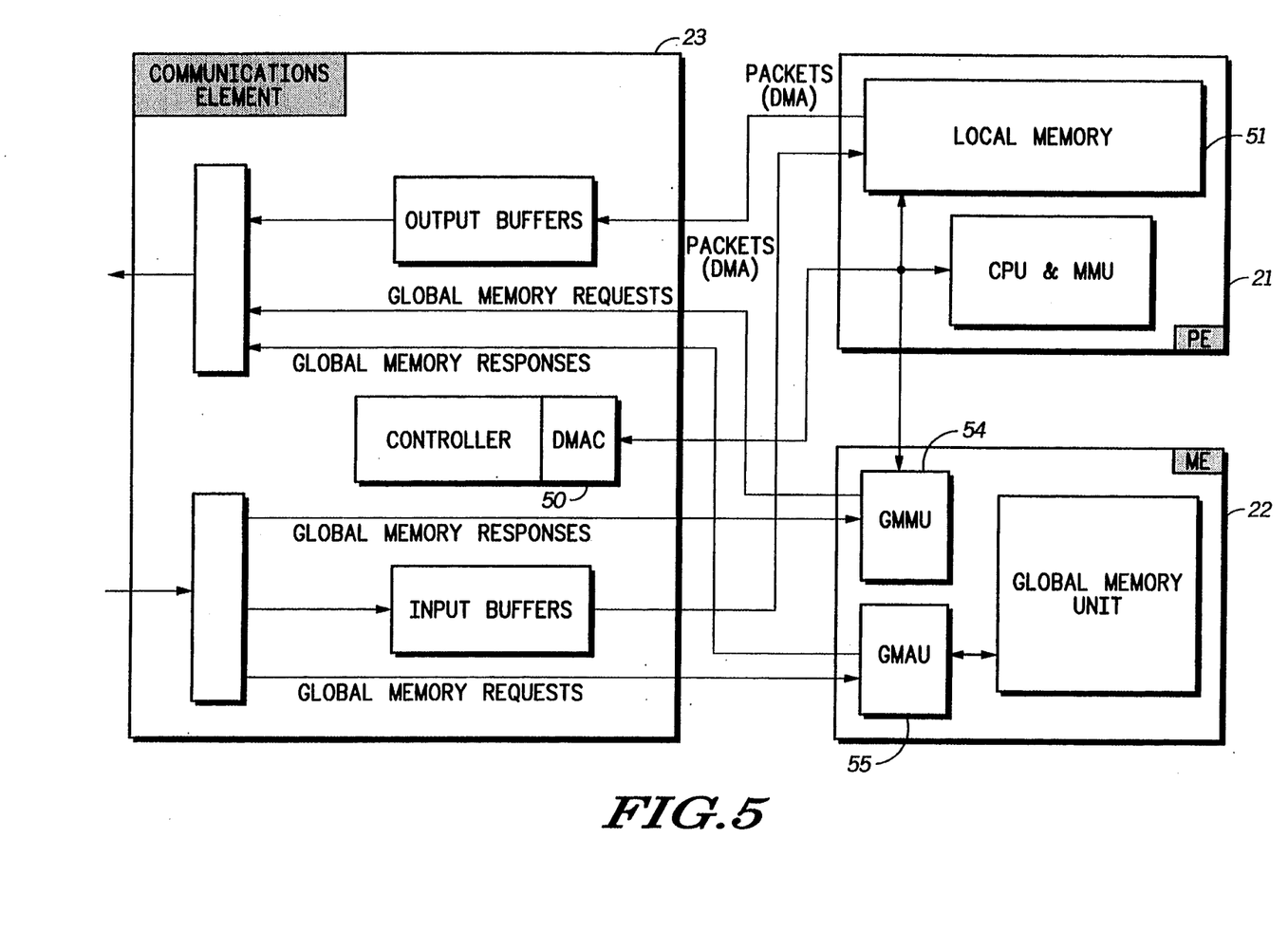
FIG. 5 shows host element structure.

The host element structure is shown in FIG. 5. The architecture does not preclude the use of specialised nodes designed for paradigms like dataflow. Requests and responses for global memory, passed directly to the ME22. The CE23 also incorporates an associated direct memory access controller DMAC 50 for direct transfer of data to and from the PE 21 local memory 51. This DMAC 50 can optimise message transfer for the software paradigm in use, and will typically maintain message descriptors indicating the length and location in memory, of messages to be transmitted.

The functions of a shared memory element (ME22) are coordinated by an internal hardware module called a Global Memory Controller (GMC). The GMC consists of two submodules.

a) The Global Memory Management Unit 54 (GMMU) 55, which can, under kernel control, trap any physical address in a certain range, and generate a packet with a special global memory qualifier. The GMMU can interpret the type of interleaving currently in use on any address generated by the active process.

b) The Global Memory Access Unit (GMAU), accepts memory access packets passed to it by the recipient CE. The GMAU can generate single or block DMA accesses to its global memory segment. Thus block memory accesses are also supported. The GMAU could also conceivably be used to implement higher level operations, including synchronisation, list manipulation and garbage collection.

Shared memory accesses can be generated at system or user level. In the former case, the user process sees its global memory as a shared structure, not necessarily directly addressable (of RAM disk). When an access is desired, it generates a blocking or non-blocking system call, whereupon the local kernel informs the GMMU of the requirement. This technique can be used by a process to prefetch data before it is actually required. True user level accesses are generated directly by the user process, translated by the local MMU and trapped by the GMMU. The accessing process may be delayed if latency is short enough, or suspended as required.

The Network Element

Figure 6:
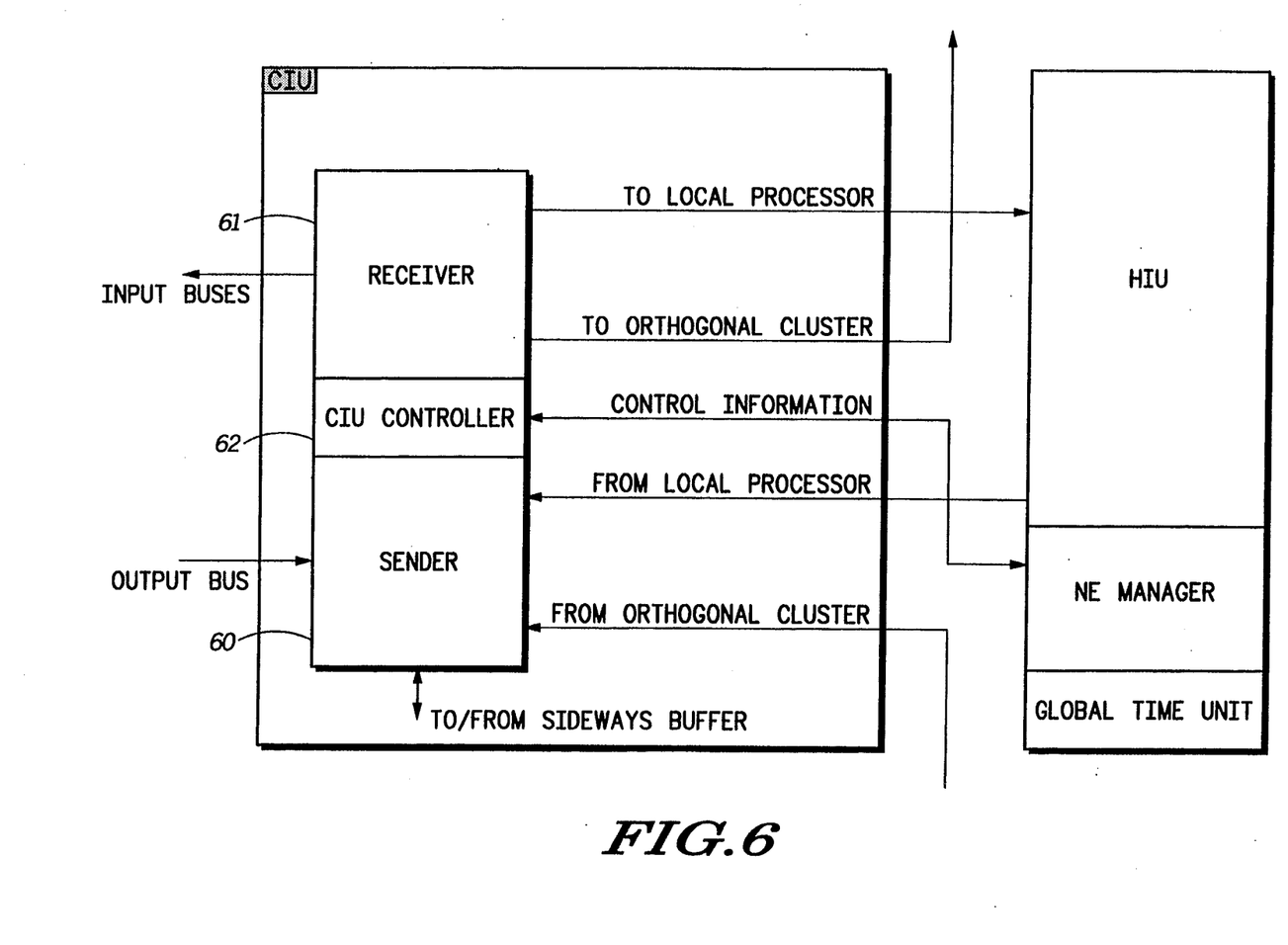
FIG. 6 shows the internal structure of cluster interface unit.

Each CIU consists of three distinct functional units (FIG. 6) (note that these functional divisions are not to be interpreted as constraints on package allocation in any VLSI implementation of an NE):

a) a Sender Unit 60 which transmits messages to other nodes within a common cluster;

b) a Receiver Unit 61 which selects messages arriving from other nodes in a common cluster, using an appropriate arbitration mechanism and either delivers them locally or routes them to another CIU.

c) a CIU Controller 62 which monitors buffer utilisation at each of the potential destinations exchanging NC Packets with correspondent CIU Controllers as necessary.

The Sender Unit 60 is responsible for transmitting packets over the cluster link using an integral automaton (i.e. a finite-state machine) called the Link Controller. Such packets may come from the HIU, if they are generated locally, or directly from any of the NEs Receiver Units (intercluster messages).

The Receiver 61 consists of several buffered input w—>1 multiplexers, each with a round-robin arbiter responsible for source selection. Packets of different types are buffered separately, as are packets destined for local or non-local delivery. However, for any given category, there is space for only on packet at each multiplexer input, so total buffer requirements are modest. Receiver buffer space is monitored by the CIU Controller: this generates NC Packets which are transferred directly to the local Sender and dispatched immediately as control frames, regardless of the data currently in transmission. When a packet arrives at an input the associated arbiter receives a transmission request only if delivery to the next node is possible. Packets selected by an arbiter are immediately directed to their appropriate destination. There are four main cases:

a) The packet is passed to the PE, via the HIU and CE, to be written directly into buffer memory associated with its destination process.

b) The packet is routed to the Sender in another CIU (intercluster traffic).

c) The packet is routed to the Global Memory Access Unit, via the HIU. A Global Memory Request Packet is sent to the GMAU which generates a direct memory access to the attached global memory module. Information, including any acquired data, is immediately forwarded to the originating node.

d) The packet is sent to the Global Memory Management Unit, again via the HIU. A Global Memory Response Packet, for example carrying read data, goes to the GMMU, where it is matched with an outstanding request.

Signal definitions are not standardised across implementations of the architecture because these will change, as appropriate, with the technology. These physical definitions are decoupled from the higher layers of the architecture, and can be altered without affecting the design of any modules other than Sender and Receiver.

The bus lines required are:

a) D15–D0 for data;

b) DELIM (Worm Delimiter), which indicates that a worm is beginning or ending (a frame flag is not used to avoid transparency complications);

c) CS (Controls Strobe) indicating a control frame;

d) DS (Data Strobe) used to indicate presence of a valid data word on the link.

Control frames are used for control level communication between sender and receiver. They are typically only one or two words in length and carry such information as receiver buffer status. Such a frame may be sent at any time, even during transmission of a data packet. The first word of a packet contains cluster addressing information as well as information to allow the receiving NC to interpret the routing information. At the Receiver, this word is removed and discarded; new routing information is now at the front of the packet.

The HIU accepts packet for local delivery directly from the CIUs, multiplexing and buffering where necessary, and sends them directly from the CIUs, reverse function, demultiplexing packets from the HE to the appropriate CIU. Associated with the Manager/HIU assembly is the system clock register (not shown), which is responsible for maintaining system time. By carefully minimising skew, it is possible to distribute a single global clock signal across the entire system, providing a time resolution of a few nanoseconds. Global time can be used where appropriate, to stamp packets, as well as to synchronise HE activity.

One of the most difficult problems in multicomputer design is that of selecting an interconnection strategy which is sufficiently versatile to provide true general support for parallel applications in machines based on large numbers of powerful processing elements. The invention provides for a generalised hypercube topology which has excellent connectivity, high bandwidth and low latency. Importantly, this architecture is scalable to very large numbers of processors, and should enable the construction of MIMD machines with $10^3$–$10^5$ PEs, suitable for both fine-grain and coarse-grain programming techniques.

What is claimed is:

1. A processor comprising:
    a plurality of processing elements arranged in an array of D dimensions, where D is a positive integer greater than one, for parallel processing,
    each of said processing elements of the array having at least one and no more than two outputs per dimension and a plurality of inputs per dimension, separate from said outputs,
    said processing elements being divided into a plurality of clusters extending across all D dimensions, each processing element being a member of a cluster in each of the D dimensions, whereby each processing element of the array is a member of D different orthogonal clusters;
    each cluster comprising a bidirectional bus connected to all the processing elements in that respective cluster, said bus being connected to said at least one and no more than two outputs of each processing element in said cluster and to said plurality of inputs of each processing element in said cluster for communicating messages from any processing element in said cluster to all other processing elements in said cluster.

2. A processor according to claim 1, wherein the elements in a cluster are arranged in a line in a given dimension having first and second ends and a processing element positioned between the ends of the line having one output means for sending messages along the line to other elements on one side of said processing element in a first direction along the line and separate output means for sending messages to elements on the opposite side thereof in a second direction along the line, opposite to said first direction.

3. A processor according to claim 1, wherein each element comprises communications means for generating message packets for sending to other elements, and said communications means comprises means for generating an address identifying whether a packet is destined for the same cluster of processing elements or a different cluster of processing elements.

4. A processor according to claim 3, wherein each processing element comprises: means for receiving message packets from other processing elements in a cluster on one bus; means for identifying whether a packet is destined for the same cluster or a different, orthogonal cluster; a memory; and means for writing the packet into memory within the processing element if said packet is destined for the same cluster but retransmitting the packet on a different, orthogonal bus if said packet destined for a different cluster.

5. A processor according to claim 1, wherein each processing element further comprises means for receiving a message packet including an address, means for changing an address therein and means for retransmitting the packet.

6. A processor according to claim 1, wherein each processing element further comprises means for generating message packets for sending to other processing elements, wherein each packet contains a single address part, and at least one of a single instruction part and a single data part.

7. A processor according to claim 1 wherein the bus of a cluster is arranged to be electrically driven by an output device of only one element connected thereto.

8. A processor according to claim 1 having between two and three dimensions.

9. A processor comprising:
    a plurality of processing element clusters arranged in an array of D dimensions, where D is a positive integer greater than one, each cluster comprising:
        a plurality of processing elements, each processing element comprising processing means, at least one and no more than two outputs, and, separately, an input corresponding to each other processing element in the cluster, and
        a bi-directional bus connecting an output of each processing element in the cluster to an input of each other processing element in the cluster;
    whereby each bus transfers messages between processing elements in a cluster;
    each processing element being a member of a cluster in each orthogonal dimension and each processing element comprising at least one and no more than two further outputs for each other cluster of which said processing elements is a member and a separate and additional input corresponding to each other processing element of said other cluster, whereby each processing element transfers messages between busses of different clusters in different dimensions.

10. A processor comprising:
    a plurality of processing elements arranged in D dimensions where D is a positive integer greater than one and divided into clusters of processing elements, each processing element being a member of one cluster in each of said D dimensions.
    each cluster comprising a bi-directional bus for communicating between processing elements in that cluster;
    each processing element of each cluster comprising at least one and no more than two output lines per dimension:
    each processing element of each cluster comprising an input line corresponding to each other processing element of each cluster of which said processing element is a member;
    connection means connecting each processing element in a cluster to the bus in that cluster by an output line, for sending messages to a plurality of other processing elements in the cluster and by a separate input line corresponding to each other processing element in the cluster, for receiving message from each other processing element in the cluster.

11. A processor according to claim 10, wherein the processing elements in a cluster are arranged in a line and a processing element positioned between the ends of the line having one output means for sending messages along the line to other processing elements on one side of said processing element in a first direction along the line and separate output means for sending messages to processing elements on the opposite side thereof in a second direction along the line, opposite to said first direction.

12. A processor according to claim 11, wherein each processing element comprises communications means for generating message packets for sending to other processing elements, and said communications means comprises means for generating an address identifying whether said packet is destined for the same cluster of processing elements or a different cluster of processing elements.

13. A processor according to claim 12, wherein each processing element comprises means for receiving message packets from other processing elements in a cluster on one bus, means for identifying whether a packet is destined for the same cluster or a different, orthogonal cluster and means for writing the packet into memory within the processing element if said packet is destined for the same cluster but retransmitting the packet on a different, orthogonal bus if said packet is destined for a different cluster.

14. A processor according to claim 10, wherein each processing element further comprises means for receiving a message packet, means for changing an address therein and means for retransmitting the packet.

15. A processor according to claim 10, wherein each processing element further comprises means for generating message packets for sending to other processing elements, wherein each packet contains a single address part, and at least one of a single instruction part with and a single data part.

16. A processor according to claim 10 wherein the bus of a sub-set is arranged to be electrically driven by an output device of only one processing element connected thereto.

17. A processor according to claim 10 having between two and three dimensions.

* * * * *